United States Patent [19]

Mueller et al.

[11] Patent Number: 4,978,738

[45] Date of Patent: * Dec. 18, 1990

[54] HIGH MOLECULAR WEIGHT, THERMALLY SOLUBLE POLYIMIDES

[75] Inventors: Werner H. Mueller, Corpus Christi, Tex.; Rohitkumar H. Vora; Dinesh N. Khanna, both of West Warwick, R.I.

[73] Assignee: Hoechst Celanese Corp., Somerville, N.J.

[*] Notice: The portion of the term of this patent subsequent to Jun. 27, 2090 has been disclaimed.

[21] Appl. No.: 217,914

[22] Filed: Jul. 12, 1988

[51] Int. Cl.$^5$ .................. C08C 2/00; C08G 12/00; C08G 63/00; C08G 69/26

[52] U.S. Cl. .................. 528/220; 528/176; 528/188; 528/229; 528/353

[58] Field of Search .............. 528/353, 176, 188, 229, 528/220

[56] References Cited

FOREIGN PATENT DOCUMENTS 1062435  3/1967  United Kingdom ............... 528/353

Primary Examiner—John Kight, III
Assistant Examiner—P. Hampton-Hightower
Attorney, Agent, or Firm—Michael W. Ferrell

[57] ABSTRACT

High molecular weight polyimides are formed by polycondensation of 2,2-bis(4-aminophenyl) hexafluoropropane or 2,2-bis(3-aminophenyl) hexafluoropropane with one or more of bis-(3,4 dicarboxyphenyl) ether dianhydride; 3,3', 4,4' benzophenone tetracarboxylic acid dianhydride; 3,3', 4,4' diphenyl tetracarboxylic acid dianhydride and 2,2-bis(3,4 dicarboxyphenyl) hexafluoropropane dianhydride. Generally, the polymers of the present invention are characterized by a molecular weight of more than about 90,000.

20 Claims, No Drawings

HIGH MOLECULAR WEIGHT, THERMALLY SOLUBLE POLYIMIDES

TECHNICAL FIELD

The present invention relates generally to polyimides and more specifically to polyimides containing hexafluoroisopropylidene linkages.

BACKGROUND ART

Polyimides in general are well known in the art to be useful for high temperature applications, since they have a glass transition temperature of about 300 degrees Celsius and above. Such polymers may be prepared in any number of ways, perhaps the most common method being a two-step process including reacting a dianhydride such as pyromellitic dianhydride (PMDA) with a diamine to form a soluble polyamic acid which is then cyclized, thermally or by chemical means to form a polyimide.

Such procedures have been employed in connection with fluorinated polyimides as shown, for example, in U.S. Pat. No. 3,356,648 to Rogers. Example 11 of the '648 patent discloses a method of preparing a polyimide from 2,2-bis(3,4-dicarboxyphenyl) hexafluoropropane dianhydride and 2,2-bis(4-aminophenyl) Equimolar amounts of the diamine and dianhydride are stirred together in dioxane for about eighteen hours at room temperature to form a polyamic acid. To the polyamic acid is added acetic anhydride and a minor amount of beta-picoline After stirring for about 15 minutes, without cooling, the mixture is poured onto a glass plate to form a gel film. The gel film is heated in an oven at 120° C. for twelve hours, then heated two more hours at 250° C. to form a polyimide film. The polyimide film thus produced is reportedly soluble in chloroform, benzene, dioxane and acetone.

Other fluorinated polyimides are disclosed in U.S. Pat. No. 3,959,350 to Rogers. In Example I of the '350 patent, a fluorinated polyimide is prepared by mixing equimolar amounts of the 2,2-bis(3,4-dicarboxyphenyl) hexafluoropropane dianhydride and 4,4'-diaminodiphenyl ether in dimethylacetamide under a nitrogen atmosphere at room temperature. The intermediate polyamic acid is converted to the corresponding polyimide by adding beta-picoline and acetic anydride.

Fluorinated polyimides prepared as above do not have the desired properties in terms of molecular weight, color and other parameters required for many applications and thus further work has been done in this field. For instance, in U.S. Pat. No. 4,645,824 to Landis et al., there is disclosed and claimed a method of preparing high molecular weight fluorinated polyimides prepared by way of cresol solution In the '824 patent, a method of preparing polyimides is described including the step step wise mixing equimolar amounts of 4,4'-hexafluoroisopropylidene bis(phthalic dianhydride) and 2,2-bis(3-aminophenyl) hexafluoropropane in cresol at room temperature. The mixture is heated to about 215° Celsius for one hour to yield polyimide of molecular weight up to about 35,000, reportedly soluble in dimethylacetamide.

The above noted polymers, while exhibiting the temperature performance characteristic of polyimides, do not exhibit the properties desired in many end-uses.

It is accordingly an object of the invention to produce fluorinated polyimide compositions exhibiting superior performance in terms of mechanical properties, thermal stability, low dielectrics, optical properties, and other, more uniform characteristics.

Another object of the invention is to achieve shaped articles of suitable properties for end uses in demanding environments.

Still further objects and advantages of the present invention will become readily apparent from the following description and claims.

SUMMARY OF INVENTION

The present invention is directed to certain high molecular weight polyimide compositions; specifically polyimide condensation products of either 2,2-bis(4-aminophenyl) hexafluoropropane or 2,2,-bis(3-aminophenyl) hexafluoropropane with one or more of a dianhydride with a diaryl nucleus selected from the group consisting of bis-(3,4 dicarboxyphenyl) ether dianhydride, (ODPA); 3,3',4,4'-diphenyl tetracarboxylic acid dianhydride (BPDA); 3,3',4,4'-benzophenone tetracarboxylic acid dianhydride (BTDA). There may additionally be provided a suitable amount of 2,2-bis(3,4 dicarboxyphenyl) hexafluoropropane dianhydride (6FDA).

The polymers of the present invention are generally soluble (before heat treatment) in solvents such as dimethyl acetamide and are useful for forming thin films due to their excellent mechanical properties. Generally, the polymers of the present invention are characterized by a molecular weight measured by GPC of at least about 90,000 and a polydispersity of from about 1.7 to about 2.6.

DETAILED DESCRIPTION

The invention is discussed in detail below in connection with several examples. For purposes of brevity only, and not by way of limitation, terminology, measurements and procedures are now enumerated. Unless otherwise indicated, terms are used throughout as detailed below.

INHERENT VISCOSITY

The inherent viscosity of polymer samples was obtained by measuring the viscosity of the polymer solution and the solvent and the inherent viscosity (IV) was calculated from the following equation:

$$\text{Inherent Viscosity} = \frac{\text{Natural Logarithm}\left(\frac{\text{Viscosity of Polymer Solution}}{\text{Viscosity of Solvent}}\right)}{C}$$

where C is the concentration expressed in grams of polymer per milliliters of solution. In all cases, inherent viscosity was measured using 0.5 grams of polymer or reaction mixture in ml of dimethyl acetamide at 25 degrees Celsius.

MOLECULAR WEIGHT DATA

The molecular weight of the polymers, whether weight average molecular weight, $M_w$ or number average molecular weight $M_n$ were measured by gel permeation chromatography (GPC) performed on dilute solutions of the polymer in tetrahydrofuran (THF). The actual apparatus employed consisted of a Waters (Millipore Corp.) programmable automatic sampler, vacuum pump, chromatography columns with heater, and a differential refractometer connected to a Shimadzu CR 30A data reduction system with accompanying software (version 1.1, Shimadzu part No. T/N 22301309-91). The refractometer used was a Waters model 410 and four chromatography columns, 500 Angstrom, 1000 Angstrom, 10,000 Angstrom and 100,000 Angstrom (available from Waters) were connected in series. The system was calibrated using multiple available polystyrene standards ranging in molecular weight as follows:

TABLE 1

GPC CALIBRATION

| Calibration Standard (Polystyrene) | Mol. Wt. |
| --- | --- |
| 1 | 470,000 |
| 2 | 170,000 |
| 3 | 68,000 |
| 4 | 34,500 |
| 5 | 9,200 |
| 6 | 3,200 |
| 7 | 1,250 |

The standards are essentially monodisperse, consisting substantially of a single molecular weight. With the system thus calibrated the weight average molecular weight $M_w$, the number average molecular weight $M_n$, and polydispersity, $M_w/M_n$ were obtained for polymers produced in accordance with the examples given hereinafter.

ELECTRICAL, THERMAL, MECHANICAL PROPERTIES

Glass transition temperatures (Tg) were determined by differential scanning calorimetry using a Perkin Elmer DSC-4 calorimeter operating at 20° C./min, nitrogen atmosphere at 60cc/min. Glass transition temperature by this method is generally defined as the point of intersection of tangent lines about the point of first inflection of the heating curve of the polymer. Thermogravimetric analysis was performed with a Perkin Elmer 65-2 analyzer at 20° C./min with an air rate of 80 cc/min. TGA values given herein are for five percent weight loss; in other words, the temperature at which 5% weight loss is observed is reported.

Mechanical properties were measured in accordance with ASTM D-882-81 using an Instron model 4202 provided with a computer interface (Series IX, version 2.51 software). Cross head speed was set at 0.2 inch/minute and gauge length was two inches. Unless otherwise indicated, a one hundred pound load cell was used, sample width was 0.5 inches and tests were conducted at 75° F. with a relative humidity of fifty per cent.

REACTANTS

Monomers used in accordance with the examples which follow are preferably substantially analytically pure; for example, "electronic" grade 6FDA is preferable. This material contains more that 98.5% dianhydride, less that 1.5% of the corresponding monoanhydride-diacid and less than 0.1% of the corresponding tetra-acid. The 2,2-bis(3,4-dicarboxy phenyl) hexafluoropropane dianhydride specified herein (6FDA) is available from Hoechst-Celanese Corporation, Route 202-206 North, Somerville, N.J. 08876. Electronic grade dianhybride contains less than 10 ppm sodium, less than 5 ppm iron, less than 2 ppm cobalt and less that 2 ppm manganese, and has a melting point of 246.5 degrees Celsius. The BTDA utilized in the examples given hereinafter was a high purity polymer grade, 98.5% pure at a minimum with 1.5% monohydride and tetra acid at most with maximum ionic impurities of NA, K and FE of 0.6 ppm, 0.2 ppm and 1 ppm respectively. BPDA was obtained having an assay minimum of 99.5 per cent, maximum ionic impurities 1.4 ppm NA, 1.4 ppm K, 1.5 ppm FE. BTDA and BPDA specified above, i.e. high purity polymer grades, are available from Chriskev, of 5109 W. 111th Terrace, Leawood, Kansas. Likewise, the ODPA, greater than 99% pure was obtained from Occidental, 2801 Long Road, Grand Island New York.

Diamine utilized in accordance with the present invention is also preferably substantially analytically pure. To obtain the preferred purity of the diamines noted hereinafter, an available grade or synthesized grade of 2,2-bis(4-aminophenyl) hexafluoropropane or 2,2-bis(3-aminophenyl) hexafluoropropane is dissolved in aqueous hydrochloric acid and treated with activated charcoal stirred for thirty minutes and filtered. The treatment is repeated as necessary to remove color impurities, the aqueous solution obtained after repeated filtering is treated with ammonium hydroxide until the pH of the resulting slurry is about 9. The diamine slurry is then filtered and washed with de-ionized or distilled water to form a filter cake, which in turn is redissolved in methanol and clarified through a five micron or smaller filter. Subsequently, diamine is precipitated from the methanol solution by the addition of distilled or de-ionized water and washed, also with water. The moist diamine is dried overnight in a vacuum oven and contains less that 10 ppm iron, sodium and chloride ions. Further information concerning diamines may be found in copending application Ser. No. 105,857 filed Oct. 7, 1987, still pending, a continuation-in-part of which has issued as U.S. Pat. No. 4,906,741, the disclosure of which is incorporated herein by reference.

EXAMPLE I

A 3 neck flask was fitted with a stirrer, condenser, ice water bath, thermometer and nitrogen atmosphere. To the flask, 334 g (1.0 mole) of 2,2-bis(4-aminophenyl) hexafluoropropane along with 1000 grams of freshly distilled N-methyl pyrrolidone (NMP) was charged. The mixture was agitated for several minutes at room temperature to get a clear, slightly yellow, solution. The solution was then cooled to slightly below room temperature (about 21° C.) and 295.68 grams of BPDA was added portion wise in equal intervals and amounts over a period of about thirty minutes. Based on 99.5% purity, 295.68 grams of a commercially available high purity polymer grade of BPDA would be one mole. The addition of anhydride must be carefully executed while the reaction mixture is agitated gently so that the solution is maintained between 25 and 30 degrees Celsius. After BPDA addition, the beakers containing monomers were washed with an additional 1518 grams of NMP and the NMP and residual monomer was added to the reaction mixture to obtain a solution of twenty per cent non volatile concentration. The mixture, maintained at between at a uniform temperature between about 25 and 30 degrees Celsius is agitated gently for about 14 hours and sample of the polyamic acid formed is withdrawn for viscosity analysis. To the polymerized mixture, 80.1 grams of beta-picoline are added and fully dispersed. After the beta picoline 801 grams of acetic anhydride were subsequently added dropwise and the mixture is agitated gently for an additional twenty-two hours (also at 25°-30° C., uniform temperature) to complete cyclization. The above process, and those described below, were all carried out in a dry nitrogen atmosphere and reactants are all added in portions so that undesirable effects are avoided. Likewise, it is important to keep the temperature of the reaction mixture suitably uniform in all steps; for example, if the temperature is allowed to elevate locally, even during cyclization, the reaction mixture may gel and not form suitable polymer.

The polymer formed as above was precipitated from solution in methanol by the addition of methanol to the reaction liquor, that is by reverse precipitation, using 2000 ml of methanol for every 500 g of polymeric solution. The resulting polymer is then washed with additional fresh methanol. Properties of the polymer (after drying) and polyamic acid appear in Table 2.

EXAMPLE II

Following the procedure of Example I, the following materials were used:
334 grams 2,2bis(4-aminophenyl) hexafluoropropane
327.10 grams BTDA
2644.4 grams freshly distilled NMP
845 grams acetic anhydride
84.5 grams beta-picoline.
Reaction times and temperatures (approximate) appear below:

| Reactant mixing in 1000 g NMP: | 25 minutes |
|---|---|
| Polymerization time at 20 per cent concentration: | 15 hours |
| Polymerization temperature: | 20-25° C. |
| Cyclization time: | 23 hours |
| Cyclization temperature: | 25-30° C. |

Data on the polymer and intermediate polyamic acid appears in Table 2.

EXAMPLE III

Following the procedure of Example I, the following materials were used:
334 g of 2,2bis(4-aminophenyl) hexafluoropropane
310 grams ODPA
2576 grams freshly distilled NMP
850 grams acetic anhydride
85.0 grams beta picoline
Reaction times and temperatures are given below:

| Reactant mixing in 1000 g NMP: | 20 minutes |
|---|---|
| Polymerization time at 20 per cent concentration: | 15 hours |
| Polymerization temperature: | 20-25° C. |
| Cyclization time: | 24 hours |
| Cyclization temperature: | 25-30° C. |

After the polyamic acid was formed, the reaction mixture was extremely viscose to the point where it could not be stirred. Data on the polymer and intermediate polyamic acid appears in Table 2.

EXAMPLES IV-VI

Additional polyimides were prepared in accordance with Example I utilizing mixtures of dianhydrides with 2,2-bis-(4-aminophenyl) hexafluoropropane. Procedure followed was otherwise substantially identical, although a smaller batch size was used and the dianhydrides were blended before being added to the diamine.

In Example IV, the following materials were utilized to make the polymer;
66.8 grams 2,2bis(4-aminophenyl) hexafluoropropane
31.06 grams ODPA
29.67 grams BPDA
510.2 grams NMP
156.3 grams acetic anhydride
15.63 grams beta-picoline
Times and temperatures of the various steps of Example IV appear below:

| Reactant mixing in 200 g NMP: | 15 minutes |
|---|---|
| Polymerization time at 20 per cent concentration: | 15 hours |
| Polymerization temperature: | 30° C. |
| Cyclization time: | 2 hours |
| Cyclization temperature | 30° C. |

In this Example IV the reactants were mixed at about 23° C. where the temperature was maintained during the initial mixing (or polymerization initiation) step.

Example V was substantially identical to Example IV except that the following materials were used:
66.8 grams 2,2-bis(4-aminophenyl) hexafluoropropane
31.06 grams ODPA
32.71 grams BTDA
522.28 grams NMP
160.2 grams acetic anhydride
16.02 grams beta-picoline Example VI was substantially identical to Example V, and the following materials were employed:
33.3 grams 6FDA
50.1 grams 2,2bis(4-aminophenyl) hexafluoropropane
23.25 grams ODPA
426.6 grams NMP
96.65 grams acetic anhydride
9.67 9rams beta-picoline.
The reaction time was slightly longer, however, than in Example V.

Data relating to the polymer produced by way of Examples IV through VI appears in Table 2.

FILM PREPARATION

Films were prepared from polymers prepared as in Examples I through VI by dissolving twenty five grams of solid, granular polymer in one hundred grams of 70/30 gamma-butyrolactone/diglyme mixture to achieve a colorless, clear solution of twenty percent N.V. concentration. Films were then cast on a clean glass plate by spreading the solution with a doctor's blade, followed by heating in an air circulating oven with the following heating sequence:
2 hrs. @70° C.
1.5 hrs. @100° C.
1.0 hr. @150° C.
0.5 hr. @200° C.
0.5 hr. @250° C.
1.0 hr. @350° C.

Data on mechanical properties appears in Table 3 below, as well as heat aging data on the powdered polymer. In all cases the film tested was substantially solvent free, having a solvent content of less than two per cent.

In all cases, the film was flexible and non-brittle. Films exhibiting elongation at break greater than about 10 per cent for example are useful in electronic multilayer structures, for example, an electronic laminate employing films of the present invention should be extremely durable. All films were soluble in NMP, methylene chloride, and methyl ethyl ketone and exhibited low color. The films of Examples 3 and 6 were substantially colorless, while the other films exhibited either pale yellow or amber color.

SOLVENT AGING

The polymers of Examples I through VI were formed into thin films on silicon wafers and heat treated at 350° C. for two hours before being placed in methyl ethyl ketone. Solvent aging data at room temperature and 70° C. appears in Table 4 below.

In addition to the above Examples, polymer was prepared using essentially the same procedure and equimolar amounts of 2,2-bis-(3-aminophenyl) hexafluoropropane and ODPA to yield polymer with a glass transition temperature of 231° C. and a TGA value (5% loss) of 530° C. Polymer data was as follows:

| | |
|---|---|
| Polyamic Acid IV (dl/gm) | 0.83 |
| Polyimide IV (dl/gm) | 0.65 |
| Molecular Weight of Polyimide | |
| $M_w$ | 93,092 |
| $M_n$ | 42,495 |
| Polydispersity | 2.1 |

Further, a two mil film of the 2,2-bis(3-aminophenyl) hexafluoropropane/ODPA material had the following mechanical properties:

| | |
|---|---|
| Tensile Strength (PSI) | 16 470 |
| Tensile Modulus (KSI) | 433 |
| Elongation at Break (%) | 4.95 |

The invention has been described in detail hereinabove with respect to several embodiments and accordingly, further explanation, data and examples is deemed unnecessary. Various modifications will be obvious to those of ordinary skill in the art; which modifications are within the spirit and scope of the present invention which is limited only by the appended claims.

We claim:

1. A high molecular weight soluble polyimide condensation product composition produced from a diamine selected from the group consisting of 2,2-bis (3-aminophenyl) hexafluoropropane, 2,2-bis (4-aminophenyl) hexafluoropropane and mixtures thereof and an equimolar amount of dianhydride consisting essentially of a compound or mixture selected from the group consisting of bis-(3,4 dicarboxyphenyl) ether dianhydride, 3,3',4,4' diphenyl tetracarboxylic acid dianhydride, and 3,3',4,4' benzophenone tetracarboxylic acid dianhydride, said polyimide optionally containing recurring units of the residue of 2,2-bis (3,4 dicarboxyphenyl) hexafluoropropane dianhydride and wherein said polyimide has a molecular weight of at least about 90,000, a polydispersity of from about 1.7 to about 2.6, thermal stability to at least about 525° C. and an inherent viscosity of at least about 0.8.

TABLE 2
POLYMER MOLECULAR WEIGHT INHERENT VISCOSITY AND THERMAL PROPERTIES

| Example | Polyamic Acid IV | Polyimide $M_w$ | Polyimide $M_n$ | Polyimide Polydispersity | Polyimide IV | Polyimide Tg °C. | Polyimide TGA, 5% wt. loss °C. |
|---|---|---|---|---|---|---|---|
| I   | 1.19 | 147,300 | 69,700 | 2.1 | 1.0  | 355 | 540 |
| II  | 1.15 | 95,000  | 32,700 | 1.7 | 0.73 | 307 | 535 |
| III | 1.35 | 117,000 | 47,000 | 2.4 | 1.1  | 308 | 540 |
| IV  | 1.03 | 159,174 | 67,513 | 2.4 | 0.95 | 328 | 525 |
| V   | 0.99 | 149,212 | 78,216 | 1.9 | 0.82 | 310 | 540 |
| VI  | 0.92 | 129,425 | 50,076 | 2.6 | 0.8  | 311 | 562 |

TABLE 3
Polyimides & Copolyimides Based on 4,4'-6F-Daimine
Thermal and Mechanical Properties of Films
(2 Thousandths of an inch in thickness)

| Polyimide of Example | DSC Tg °C. | TGA 5% Weight Loss at °C. | Elongation % | Instrone Stress at Break psi | Young's Modulus Ksi | Wt Loss[*1] at 343° C. after 235 hrs % |
|---|---|---|---|---|---|---|
| I   | 355 | 540 | 22 | 18,000 | 390 | 3.2 |
| II  | 307 | 535 | 10 | 15,000 | 380 | 3.4 |
| III | 307 | 540 | 10 | 14,300 | 294 | 3.4 |
| IV  | 328 | 525 | 9  | 14,000 | 321 | 2.4 |
| V   | 310 | 540 | 8  | 13,000 | 297 | 3.1 |
| VI  | 311 | 562 | 9  | 13,000 | 270 | 1.9 |

*POWDERED POLYMER

TABLE 4
SOLVENT AGING OF THERMALLY CURED POLYIMIDES

| POLYIMIDE OF EXAMPLE | THERMALLY CURED (350° C./2 Hrs.) film on wafer PERCENT WEIGHT LOSS | |
|---|---|---|
| | MEK/R.T./30 min | MEK/70° C./30 min |
| I   | no loss | 0.5 |
| II  | 0.9     | 0.9 |
| III | no loss | no loss |
| IV  | 0.4     | no loss |
| V   | 1.8     | 2.8 |
| VI  | 0.5     | 0.6 |

2. The composition according to claim 1, wherein the polydispersity of said composition is from about 1.9 to about 2.4.

3. The composition according to claim 2, wherein the polydispersity of said composition is about 2.2.

4. The composition according to claim 1, wherein the molecular weight of said composition is at least about 120,000.

5. The composition according to claim 4, wherein the molecular weight of said composition is at least about 150,000.

6. The composition according to claim 1, wherein said dianhydride component consists essentially of bis-(3,4 dicarboxyphenyl) ether dianhydride.

7. The composition according to claim 1, wherein said dianhydride component consists essentially of 3,3',4,4' diphenyl tetracarboxylic acid dianhydride.

8. The composition according to claim 1, wherein said dianhydride component consists essentially of 3,3',4,4' benzophenone tetracarboxylic acid dianhydride.

9. The composition according to claim 1, wherein said dianhydride component consists of an equimolar mixture of two of said dianhydrides.

10. The composition according to claim 1 in the form of a film affixed to a substrate.

11. A polymer film consisting essentially of a high molecular weight soluble polyimide condensation product composition produced from a diamine selected from the group consisting of 2,2/-bis (3-aminophenyl) hexafluoropropane, 2,2/-bis (4-aminophenyl) hexafluoropropane and mixtures thereof and an equimolar amount of a dianhydride consisting essentially of a compound or mixture selected from the group ,consisting of bis-(3,4 dicarboxyphenyl) ether dianhydride, 3,3',4,4' diphenyl tetracarboxylic acid dianhydride, and 3,3',4,4' benzophenone tetracarboxylic acid dianhydride, said polyimide optionally containing recurring units of the residue of 2,2'-bis (3,4 dicarboxyphenyl) hexafluoropropane dianhydride and wherein said polyimide has a molecular weight of at least about 90,000, thermal stability to at least about 525° C., a polydispersity of from about 1.7 to about 2.6 and an inherent viscosity of at least about 0.8.

12. The polymer film according to claim 11, wherein the polydispersity of said composition is from about 1.9 to about 2.4.

13. The polymer film according to claim 12, wherein the polydispersity of said composition is about 2.2.

14. The polymer film according to claim 11, wherein the molecular weight of said composition is at least about 120,000.

15. The polymer film according to claim 14, wherein the molecular weight of said composition is at least about 150,000.

16. The polymer film according to claim 11, wherein said dianhydride component consists essentially of bis-(3,4 dicarboxyphenyl) ether dianhydride.

17. The polymer film according to claim 11, wherein said dianhydride component consists essentially of 3,3',4,4' diphenyl tetracarboxylic acid dianhydride.

18. The polymer film according to claim 11, wherein said dianhydride component consists essentially of 3,3',4,4' benzophenone tetracarboxylic acid dianhydride.

19. The polymer film according to claim 11, wherein said dianhydride component consists of an equimolar mixture of two of said dianhydrides.

20. The polymer film according to claim 11, wherein the elongation at break of said film is at least about 10 per cent.

* * * * *